(12) United States Patent
Azevedo et al.

(10) Patent No.: US 12,524,365 B2
(45) Date of Patent: Jan. 13, 2026

(54) PROGRAMMABLE PROVISION OF LANES OF A COMPUTING SYSTEM INTERCONNECT

(71) Applicant: Advanced Micro Devices, Inc., Santa Clara, CA (US)

(72) Inventors: George D. Azevedo, Santa Clara, CA (US); Peter Malcolm Barnes, Santa Clara, CA (US); Michael J. Tresidder, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 236 days.

(21) Appl. No.: 17/854,490

(22) Filed: Jun. 30, 2022

(65) Prior Publication Data
US 2024/0004822 A1    Jan. 4, 2024

(51) Int. Cl.
*G06F 13/40* (2006.01)
*G06F 13/42* (2006.01)
*G06F 15/78* (2006.01)

(52) U.S. Cl.
CPC ........ *G06F 13/409* (2013.01); *G06F 13/4221* (2013.01); *G06F 15/7807* (2013.01)

(58) Field of Classification Search
CPC ........ G06F 13/409; G06F 13/40; G06F 13/38; G06F 13/42; G06F 13/4217; G06F 13/4221; G06F 13/426; G06F 13/4247; G06F 13/4265; G06F 13/4282; G06F 15/7807
See application file for complete search history.

(56) References Cited

U.S. PATENT DOCUMENTS

| | | | | |
|---|---|---|---|---|
| 6,861,868 | B1 * | 3/2005 | Agrawal | H03K 19/17744 326/38 |
| 7,208,975 | B1 * | 4/2007 | Agrawal | H03K 19/17736 326/38 |
| 10,255,224 | B1 * | 4/2019 | Chiu | G06F 13/4022 |
| 2001/0052793 | A1 * | 12/2001 | Nakaya | H03K 19/17736 326/41 |
| 2011/0302329 | A1 | 12/2011 | Azam et al. | |

(Continued)

OTHER PUBLICATIONS

International Search Report and Written Opinion in International Application No. PCT/US2023/022068, mailed Aug. 8, 2023, 9 pages.

*Primary Examiner* — Raymond N Phan
(74) *Attorney, Agent, or Firm* — Kowert, Hood, Munyon, Rankin & Goetzel, P.C.; Rory D. Rankin (57) ABSTRACT

Systems, apparatuses, and methods for automatic firmware provision of high speed serializer/deserializer (SERDES) links are disclosed. A system on chip (SoC) includes one or more microcontrollers, a programmable interconnect, a plurality of physical layer engines, and a plurality of SERDES lanes. The programmable interconnect and the plurality of SERDES lanes are able to support communication protocols for interfaces such as PCIE, SATA, Ethernet, and others. On bootup, the SoC receives a custom specification of how the plurality of SERDES lanes are to be configured. The one or more microcontrollers generate a mapping for the programmable interconnect based on the specification. The mapping is used to configure the programmable interconnect to match the specification. The result is the programmable interconnect connecting the plurality of SERDES lanes to the appropriate physical layer circuits to implement the desired configuration.

20 Claims, 9 Drawing Sheets

(56) References Cited

U.S. PATENT DOCUMENTS

| | | | |
|---|---|---|---|
| 2018/0225252 A1* | 8/2018 | Jenkins | G06F 13/4282 |
| 2020/0304426 A1* | 9/2020 | Zhao | H04L 12/66 |
| 2020/0379933 A1 | 12/2020 | Worley et al. | |
| 2021/0326285 A1 | 10/2021 | Parthasarathy et al. | |
| 2021/0357355 A1 | 11/2021 | Luong | |

* cited by examiner

| Lane Number | Assignment |
|---|---|
| 1 | PCI-e Fourth Lane |
| 2 | PCI-e Third Lane |
| 3 | PCI-e Second Lane |
| 4 | PCI-e First Lane |
| 5 | Ethernet First Lane |
| 6 | Ethernet Second Lane |
| ... | ... |

405

| Lane Number | Assignment |
|---|---|
| 1 | PCI-e First Lane |
| 2 | PCI-e Second Lane |
| 3 | PCI-e Third Lane |
| 4 | PCI-e Fourth Lane |
| 5 | SATA First Lane |
| 6 | SATA Second Lane |
| ... | ... |

PROGRAMMABLE PROVISION OF LANES OF A COMPUTING SYSTEM INTERCONNECT

BACKGROUND

Description of the Related Art

In some computing systems, features of the different components of the system can be enabled or disabled on a case-by-case basis depending on the features purchased by the end user. A personal computer (PC) desktop system is an example of this type of computing system. PC desktop systems are typically composed of a motherboard, a central processing unit (CPU), graphics processing unit (GPU), memory controller, system peripherals (e.g., network interface, storage, universal serial bus (USB) ports, motherboard slots), system control functions (i.e., southbridge), and other components.

Computing system motherboards have traditionally included a southbridge or other type of interconnect for managing various input/output (I/O) interfaces. An interconnect on the motherboard can also be referred to as a chipset. It is common for processors, other chips (e.g., system-on-chips (SoCs)), serializer/deserializer (SERDES) lanes, and other components of the motherboard to have different capabilities which can be purchased by a user for additional expense. Typically, the motherboard has fuses or other switches for enabling or disabling certain capabilities, based on what the user purchases. However, setting fuses or switches results in having many different stock keeping units (SKUs) for a given motherboard, which can increase the complexity of inventory management of the motherboard.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing automatic provision of high speed serializer/deserializer (SERDES) lanes by firmware are disclosed herein. In one implementation, a microcontroller detects a first device in a first slot of a plurality of slots on a motherboard. The microcontroller is part of a system-on-chip (SoC) connected to the plurality of slots via a programmable interconnect in at least one implementation. The first device in the first slot is connected to one or more first lanes that are coupled to the programmable interconnect. If the microcontroller determines that the first device is a multi-function device, than the microcontroller programs the programmable interconnect to assign the one or more first lanes to multiple processing engines. For example, in one implementation, the first lane(s) are assigned to at least an Ethernet physical layer engine and a peripheral component interconnect express (PCI-e) physical layer engine. In other implementations, the first lane(s) are assigned to other types of physical layer engines. During operation of the first device, the multiple physical layer engines enable communication between the first device and the SoC using any of various multiple different communication protocols. This flexibility allows the motherboard to support different functionality with a common SoC. As used herein, in various implementations the term "engine" refers to a circuit or circuitry configured to perform the described functions. Therefore, a physical layer engine refers to a physical layer circuit or physical layer circuitry.

Figure 1:
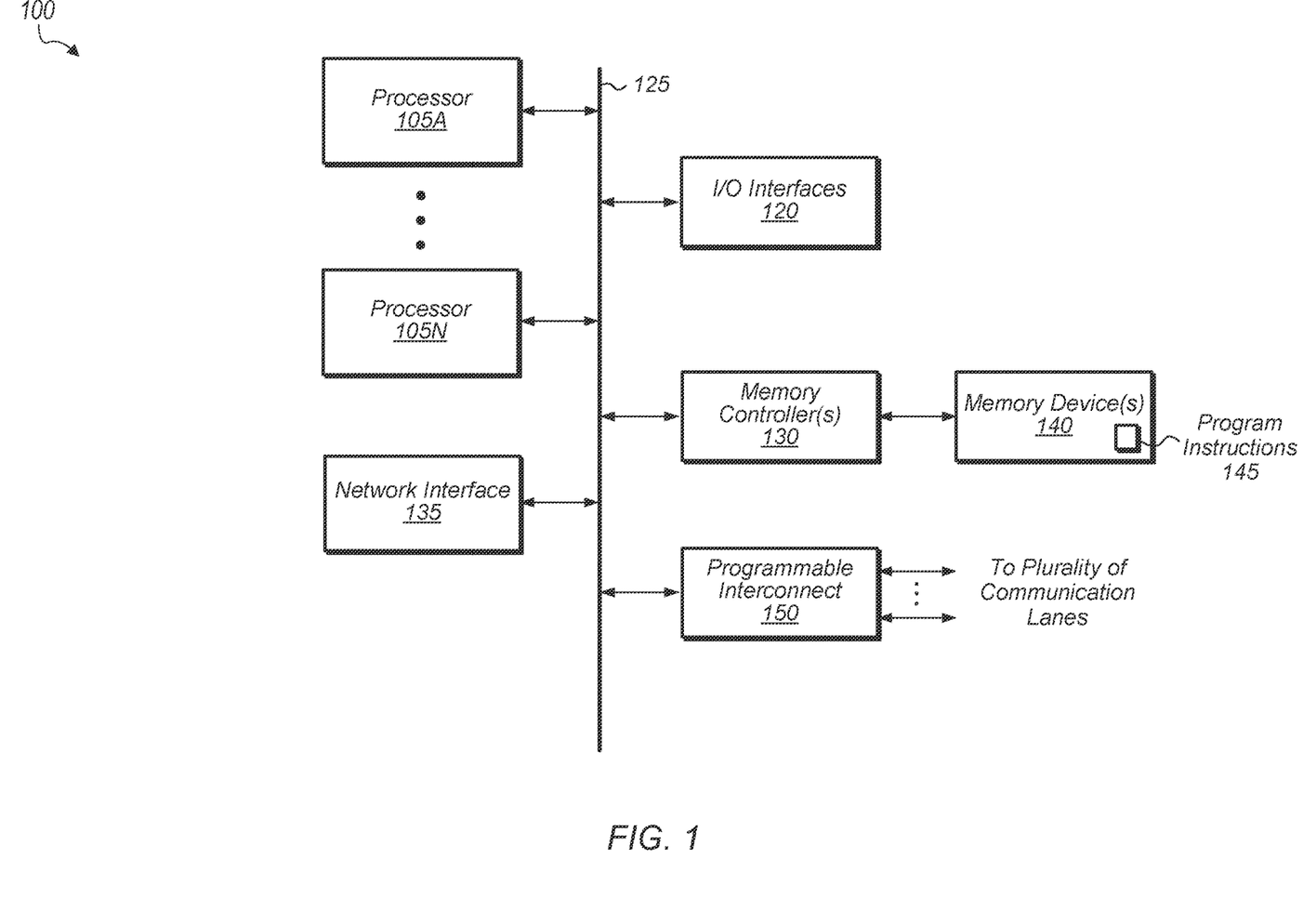
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, and programmable interconnect 150. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture, such as a graphics processing unit (GPU) which processes data, executes parallel processing workloads, renders pixels for driving to a display (not shown), and/or executes other workloads. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for a first application, a second set of program instructions for a second application, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In one implementation, programmable interconnect 150 is programmed to support a specific communication lane configuration. In one implementation, a specification of the desired communication lane configuration is retrieved at boot-up of system 100. Then, the specification is converted into a control program or set of control signals. Next, the control program or set of control signals are used to configure programmable interconnect 150 to cause the specific communication lane configuration to be realized. More details on this implementation and other implementations employing a programmable interconnect will be provided throughout the remainder of this disclosure.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer components than are shown in FIG. 1. It is also noted that in other implementations, computing system 100 includes other components not shown in FIG. 1. Additionally, in other implementations, computing system 100 is structured in other ways than shown in FIG. 1.

Figure 2:
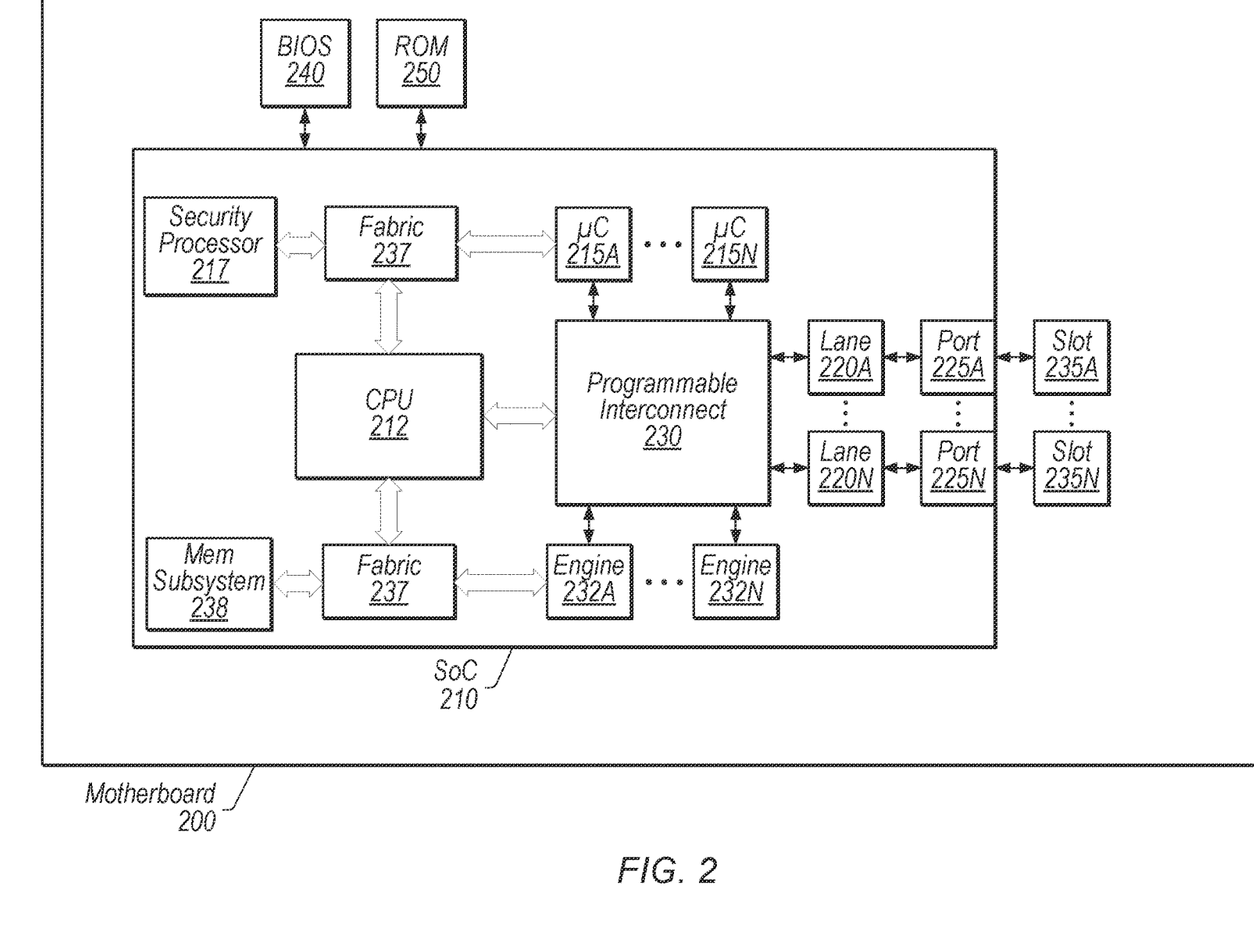
FIG. 2 is a block diagram of one implementation of a motherboard.

Turning now to FIG. 2, a block diagram of one implementation of a motherboard 200 is shown. Motherboard 200 includes at least system on chip (SoC) 210, slots 235A-N, basic input/output system (BIOS) 240, and read-only memory (ROM) 250. Motherboard 200 can include any number of other components (e.g., voltage regulators, capacitors) which are not shown to avoid obscuring the figure. SoC 210 is representative of any type and number of SoC's that can be included on motherboard 200. SoC 210 includes at least central processing unit (CPU) 212, microcontrollers (μC) 215A-N, security processor 217, serializer/deserializer (SERDES) lanes 220A-N, ports 225A-N, programmable interconnect 230, fabric 237, and memory subsystem 238. The components of SoC 210 are coupled to each other via fabric 237, which is representative of any number and type of buses, interconnects, fabrics, and the like. It is noted that SoC 210 can include any number of other components which are not shown to avoid obscuring the figure. Additionally, other types of SoC's with other arrangements of components can be employed on motherboard 200 in other implementations.

CPU 212, microcontrollers 215A-N, and communication engines 232A-N are coupled through programmable interconnect 230 to a plurality of high-speed SERDES lanes 220A-N. In one implementation, each lane 220A-N is defined as two differential signal pairs with one pair for transmitting and one pair for receiving to enable full-duplex communication. Programmable interconnect 230 enables the plurality of SERDES lanes 220A-N to be shared by the plurality of physical layer (PHY) engines 232A-N. It is noted that SERDES lanes 220A-N can be referred to more generally as "communication lanes". The number of SERDES lanes 220A-N can vary according to the implementation. The plurality of SERDES lanes 220A-N can be used for Ethernet, serial advanced technology attachment (SATA), peripheral component interconnect express (PCIe), and other communication interfaces.

At runtime, microcontrollers 215A-N program programmable interconnect 230 to match the specification for what motherboard 200 expects for each SERDES lane 220A-N. The data width of each link is also defined by the specification in at least one implementation. For example, a PCIE link can have two lanes, four lanes, eight lanes or some other number of lanes. Also, the PCIE link could be reversed. All of these settings are taken into account when programmable interconnect 230 is programmed by microcontrollers 215A-N. Programming programmable interconnect 230 based on the specification provides flexibility for motherboard 200 to have the proper pins and routing for the particular configuration purchased by a customer. This flexibility also allows the same motherboard 200 and SoC 210 to be used in a potentially large number of different configurations.

In one implementation, motherboard 200 includes boot-up firmware in BIOS 240 which is used to perform hardware initialization on power-up. The BIOS 240 represents machine code stored in a non-volatile memory, and the BIOS 240 allows a processor (e.g., CPU 212) to control important computer system functions while booting up the system. Upon power up, the CPU 212 will boot up the system by executing the code stored in BIOS 240. In some versions of motherboard 200, Unified Extensible Firmware Interface (UEFI) firmware can be used in place of the BIOS 240.

In one implementation, security processor 217 is configured to manage the configuration and security of SoC 210. In various implementations, security processor 217 is pre-loaded with any number of public/private keys. Generally speaking, security processor 217 is configured to execute instructions for performing authentication and validation functions which provide security protection for SoC 210. In one implementation, security processor 217 initiates the boot-up process of SoC 210 to ensure that SoC 210 boots up with authenticated boot code. Security processor 217 also manages various other functions associated with the boot-up process of SoC 210. In one implementation, security processor 217 retrieves firmware from ROM 250 and releases microcontrollers 215A-N to execute the firmware so as to configure programmable interconnect 230. Security processor 217 also retrieves boot code from BIOS 240, and security processor 217 releases CPU 212 to execute the boot code and to launch the operating system of SoC 210 after programmable interconnect 230 is configured.

SoC 210 includes microcontrollers 215A-N, which are representative of any number and type of microcontrollers for executing program instructions, firmware, or other types of software instructions or code. Microcontrollers 215A-N can also be referred to as cores 215A-N. In one implementation, microcontrollers 215A-N execute runtime configuration and management software routines. On boot-up, security processor 217 retrieves the firmware image from off-chip, loads the microcontrollers 215A-N and boots them. Also, configuration information for SoC 210 is retrieved, a vendor specification is received, and then the interconnect solution for programmable interconnect 230 is generated in accordance with the vendor specification and configuration information. After programmable interconnect 230 is configured, a handover is performed to CPU 212 for the system to boot.

In one implementation, programmable interconnect 230 includes a plurality of multiplexers and switching logic. Also, in one implementation, a plurality of programmable PHY engines 232A-N are available at the interface through programmable interconnect 230. The solution set generated for configuring programmable interconnect 230 ensures that routing primitives and the PHY signals are routed to the appropriate engines 232A-N. In one implementation, the flexibility of programmable interconnect 230 based on the plurality of multiplexers and switching logic allows programmable interconnect 230 to be configured to cover any permutation based on the vendor specification.

For example, in one implementation, once a solution set is generated by microcontrollers 215A-N, various resources are reserved and lanes 220A-N are assigned programmatically to the appropriate engines 232A-N through the multiplexing structures. Additionally, the proper resources for clocking are setup, the ports 225A-N are initialized, the proper number of lanes 220A-N are assigned per port 225A-N, the direction of each lane 220A-N is assigned per port 225A-N, phase-locked loops (PLL's) (not shown) are programmed, program power states (P-States) are programmed, and so on. More details on this process will be provided throughout the remainder of this disclosure.

A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to slots 235A-N. Various types of peripheral devices can be coupled to some or all of the peripheral buses. Such peripheral devices include (but are not limited to) keyboards, mice, printers, scanners, joysticks or other types of game controllers, media recording devices, external storage devices, network interface cards, and so forth.

Memory subsystem 238 includes the system memory for SoC 210, and memory subsystem 238 includes any number and type of memory devices, which can vary from implementation to implementation. The memory devices that are part of memory subsystem 238 include (but are not limited to) random access memory (RAM), static RAM (SRAM), dynamic RAM (DRAM), double data rate (DDR) DRAM, DDR2 DRAM, DDR3 DRAM, DDR4 DRAM, and so forth.

In one implementation, a ruleset (i.e., specification) is programmed into BIOS 240 and the ruleset is used to determine the targeted configuration of programmable interconnect 230, with the ruleset provided by the vendor of motherboard 200. In one implementation, microcontrollers 215A-N retrieve the ruleset from BIOS 240 during bootup. After retrieving the ruleset from BIOS 240 or ROM 250, the SERDES lanes 220A-N are assigned the proper roles based on the programming of programmable interconnect 230 by microcontrollers 215A-N so as to meet the targeted configuration desired by the vendor of motherboard 200. For example, the ruleset can specify that lanes 220A-D are PCI-e lanes in reverse order, while other lanes can have other roles.

Additionally, in one implementation, a capabilities specification that specifies the capabilities of SoC 210 is retrieved from BIOS 240 or ROM 250 by microcontrollers 215A-N. The capabilities specification can also be referred to herein as a "map" or "SoC map". With the ruleset and the SoC map, microcontrollers 215A-N generates a programming solution (i.e., solution set) for programmable interconnect 230. In some implementations, the vendor of motherboard 200 also stores an additional programmable piece of data in BIOS 240 or ROM 250. This additional programmable piece of data can be used to modify the ruleset.

In another implementation, the vendor of motherboard 200 stores pin data in BIOS 240 or ROM 250 to specify how motherboard 200 is pinned out for the specific SoC 210. In one implementation, each motherboard 200 has multiple StockKeeping Units (SKUs), and the pin data corresponds to a specific SKU. For example, in one implementation, a first SKU corresponds to a 1×16 PCI-e interface, a second SKU corresponds to a 4×4 PCI-e interface, a third SKU corresponds to a 2×4 PCI-e interface, and so on.

In various implementations, motherboard 200 or other types of circuit boards can be included in any of various types of computer systems or computing devices, including, but not limited to, a personal computer system, desktop computer, laptop or notebook computer, computing node, supercomputer, mobile device, tablet, phone, smartphone, mainframe computer system, handheld computer, workstation, network computer, watch, wearable device, a consumer device, server, file server, application server, storage server, web server, cloud computing server, or in general any type of computing system or device or portion thereof. It is noted that the number of components of motherboard 200 can vary from implementation to implementation. There can be more or fewer of each component/subcomponent than the number shown in FIG. 2. It is also noted that motherboard 200 can include other components not shown in FIG. 2. Additionally, in other implementations, motherboard 200 can be structured in other ways than shown in FIG. 2.

Figure 3:
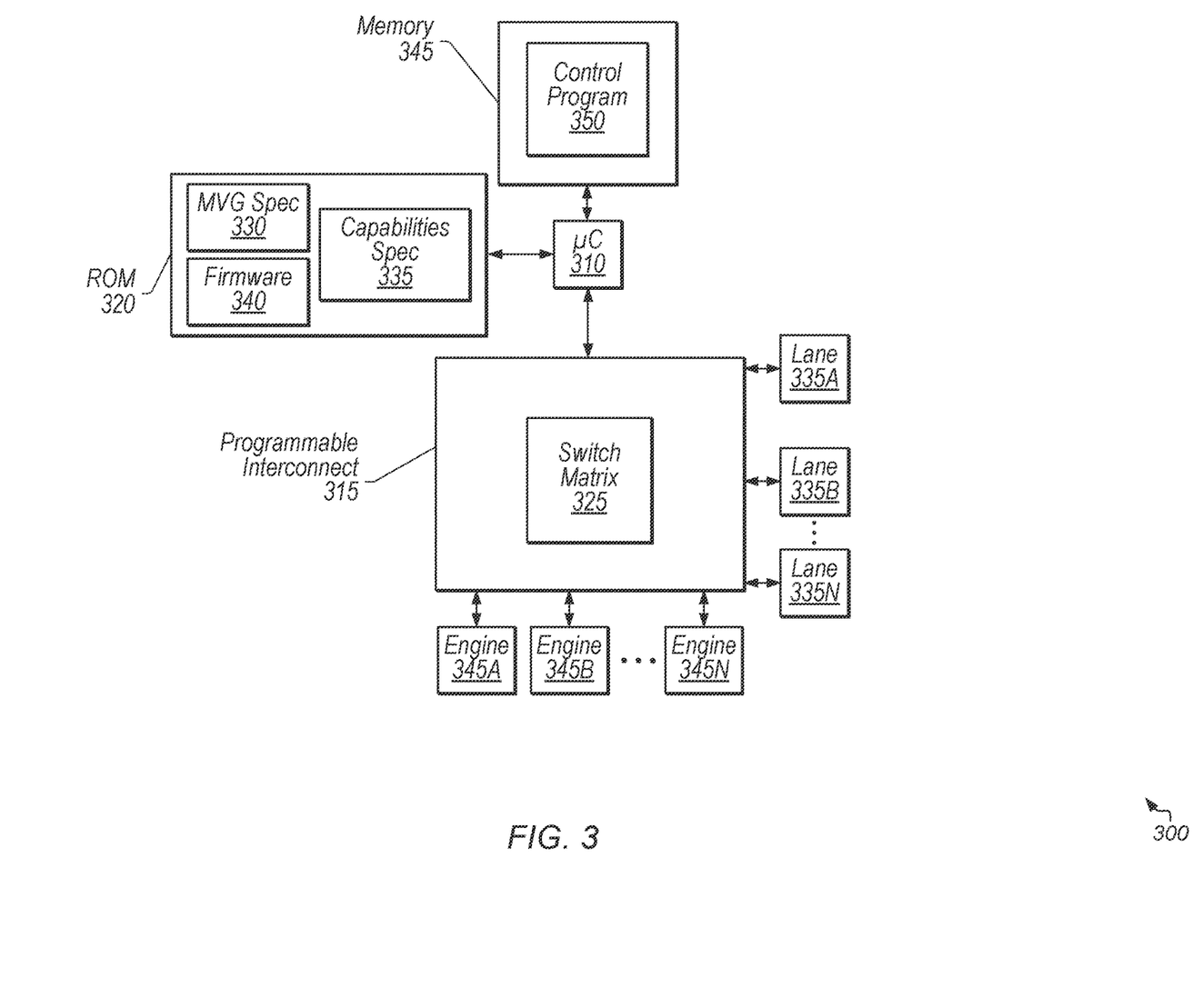
FIG. 3 is a block diagram of one implementation of an apparatus for programming a programmable interconnect based on a motherboard-vendor-generated specification.
Figure 4:
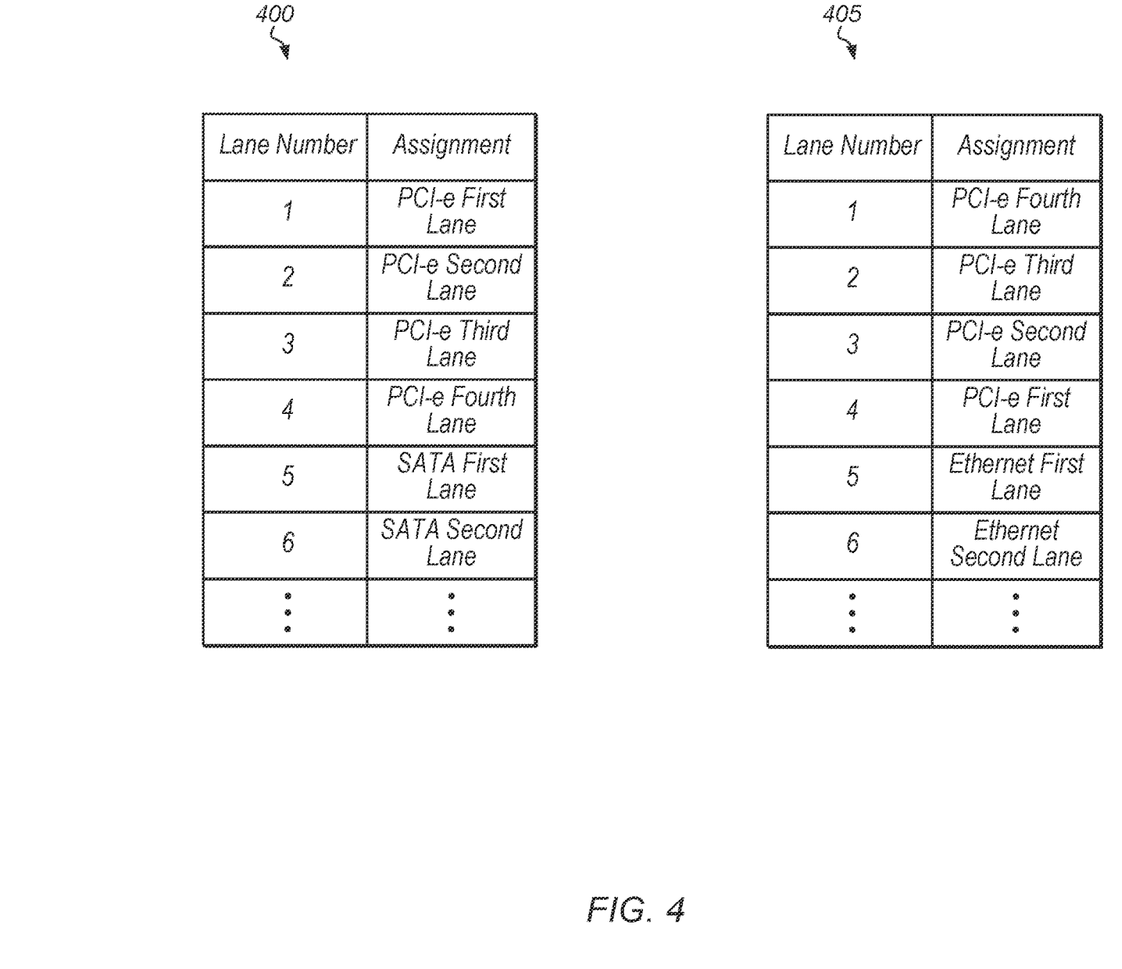
FIG. 4 includes examples of motherboard-vendor-generated specifications in accordance with various implementations.

Referring now to FIG. 3, a block diagram of one implementation of an apparatus 300 for programming a programmable interconnect 315 based on a motherboard-vendor-generated specification 330 is shown. In one implementation, during boot-up of the host computing system, microcontroller 310 retrieves a motherboard-vendor-generated (MVG) specification 330, capabilities specification 335, and firmware 340 from read-only memory (ROM) 320. In one implementation, MVG specification 330 includes a mapping of resources to lanes that are desired for a particular communication lane configuration. Examples of a MVG specification 330 are shown in FIG. 4. In one implementation, capabilities specification 335 defines the capabilities of apparatus 300, an SoC, and/or other components. After receiving MVG specification 330 and capabilities specification 335, microcontroller 310 executes firmware 340 to generate control program 350 based on MVG specification 330 and capabilities specification 335. In one implementation, firmware 340 includes program instructions for implementing an algorithm for creating control signals and/or control data for programming programmable interconnect 315 to match the desired configuration of the motherboard vendor. In one implementation, microcontroller 310 stores control program 350 in memory 345, with memory 345 representative of any type of memory device. It is noted that microcontroller 310 is representative of any number and type of microcontrollers, processor cores, control circuits, and the like.

After generating control program 350, microcontroller 310 uses control program 350 to configure programmable interconnect 315 to meet the requirements of the motherboard vendor. In one implementation, control program 350 includes control signals which program switch matrix 325 to route the SERDES lanes 335A-N to the proper communication engines 345A-N so as to meet the requirements of the motherboard vendor. In another implementation, control program 350 includes a bitfile to program a logic device (e.g., field programmable gate array (FPGA), programmable logic device (PLD)), with the logic device acting as at least a portion of the switch matrix 325. In other implementations, control program 350 can include other signals or data that causes programmable interconnect 315 to function in the desired manner. After programmable interconnect 315 has been programmed using control program 350, the resource engines 345A-N will connect with the corresponding SERDES lanes 335A-N to allow apparatus 300 to operate consistent with the motherboard vendor's requirements.

Turning now to FIG. 4, examples of motherboard-vendor-generated specifications 400 and 405 in accordance with various implementations are shown. On the left-side of FIG. 4 is a first motherboard-vendor-generated (MVG) specification 400 which is an example specification in accordance with one implementation. As shown in specification 400, lane numbers 1-4 are assigned to a four-lane PCI-e interface while lane numbers 5-6 are assigned to a SATA interface. Although not shown, specification 400 can include any number of other entries for other numbers of lanes.

On the right-side of FIG. 4 is a second MVG specification 405 which is an example specification in accordance with one implementation. As shown in specification 405, lanes 1-4 are assigned to a reverse order four-lane PCI-e interface while lanes 5-6 are assigned to an Ethernet interface. Specification 405 can also include any number of other entries for other lanes, with these other lanes assigned to various other interfaces desired by the motherboard vendor. It is noted that in other implementations, a MVG specification can have other information and/or a MVG specification can be structured in other suitable manners. For example, in another implementation, a clock speed can be specified for each separate interface.

Figure 5:
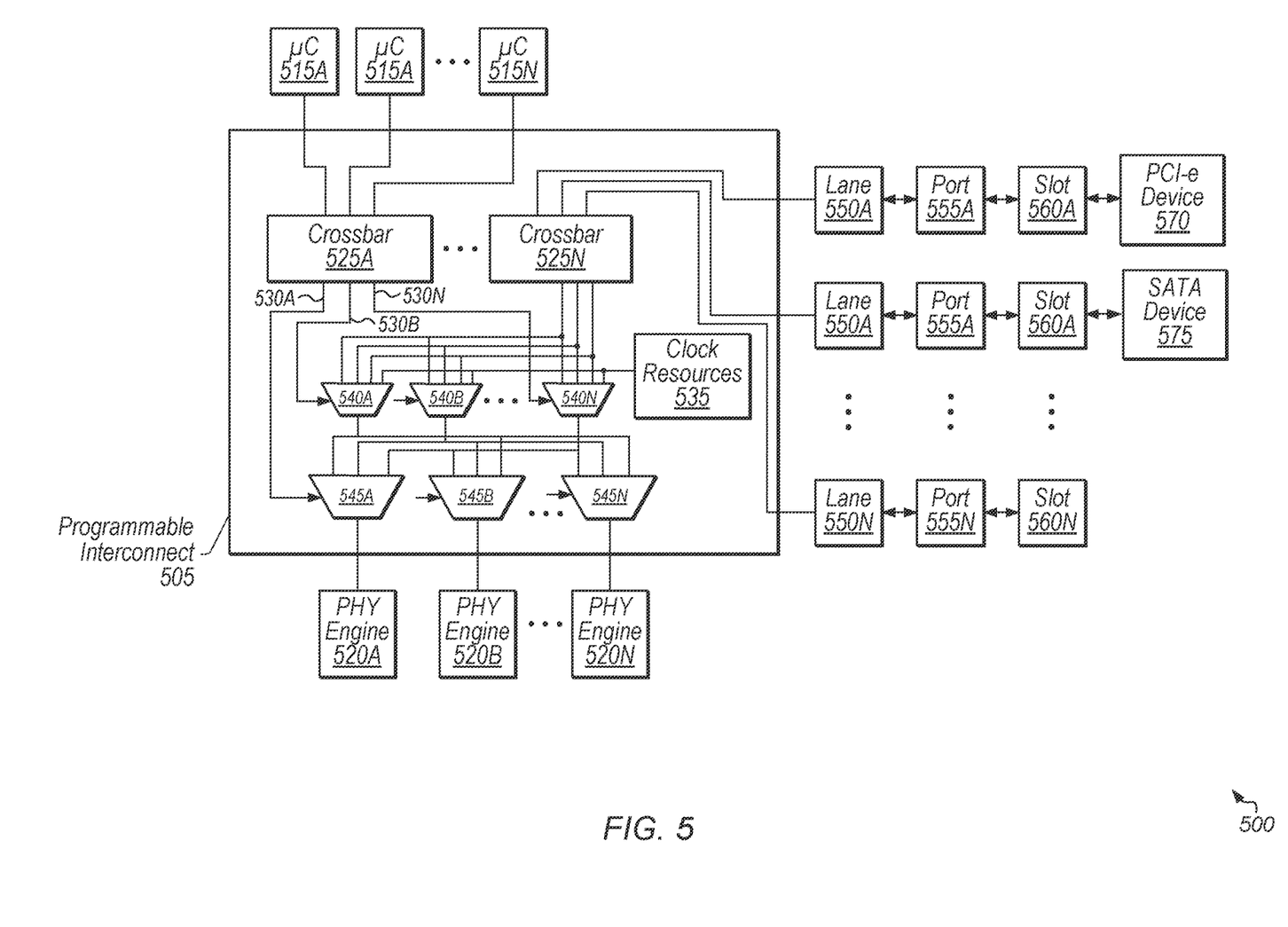
FIG. 5 is a block diagram of one implementation of an apparatus for automatic firmware provision of high speed serializer/deserializer (SERDES) lanes.

Referring now to FIG. 5, a block diagram of one implementation of an apparatus 500 for automatic firmware provision of high speed serializer/deserializer (SERDES) lanes is shown. In one implementation, apparatus 500 includes at least programmable interconnect 505, microcontrollers 515A-N, physical layer (PHY) engines 520A-N, communication lanes 550A-N, ports 555A-N, slots 560A-N, PCI-e device 570, and SATA device 575. It is noted that PCI-e device 570 and SATA device 575 are intended to serve as an example configuration to represent one particular implementation. It is also noted that apparatus 500 can include any number of other components which are not shown to avoid obscuring the figure.

Microcontrollers 515A-N are representative of any number of microcontrollers, processor cores, control circuits, programmable logic devices (PLDs), field programmable gate arrays (FPGAs), application specific integrated circuits (ASICs), and the like which are configured to program programmable interconnect 505 to enable the proper layout for communication lanes 550A-N based on the end-user's specific configuration. In one implementation, microcontrollers 515A-N generate control signals 530A-N to select the appropriate lanes and clock resources 535 to pass through multiplexers 540A-N and 545A-N to and from physical layer engines 520A-N. In other implementations, microcontrollers 515A-N generate other types of signals and/or data to program programmable interconnect 505.

In one implementation, programmable interconnect 505 includes an arrangement of crossbars 525A-N and multiplexers 540A-N and 545A-N to route data and clocks from clock resources 535 in between lanes 550A-N and physical layer engines 520A-N. Clock resources 535 include any number of phase-locked loops (PLLs) and other circuits for generating clocks at the desired frequencies. In one implementation, microcontrollers 515A-N generate control signals 530A-N based on a first specification defining the target configuration of the end-user and based on a second specification defining the capabilities of apparatus 500. This allows programmable interconnect 505 the flexibility to be customized to any of various desired end-user deployments.

Figure 6:
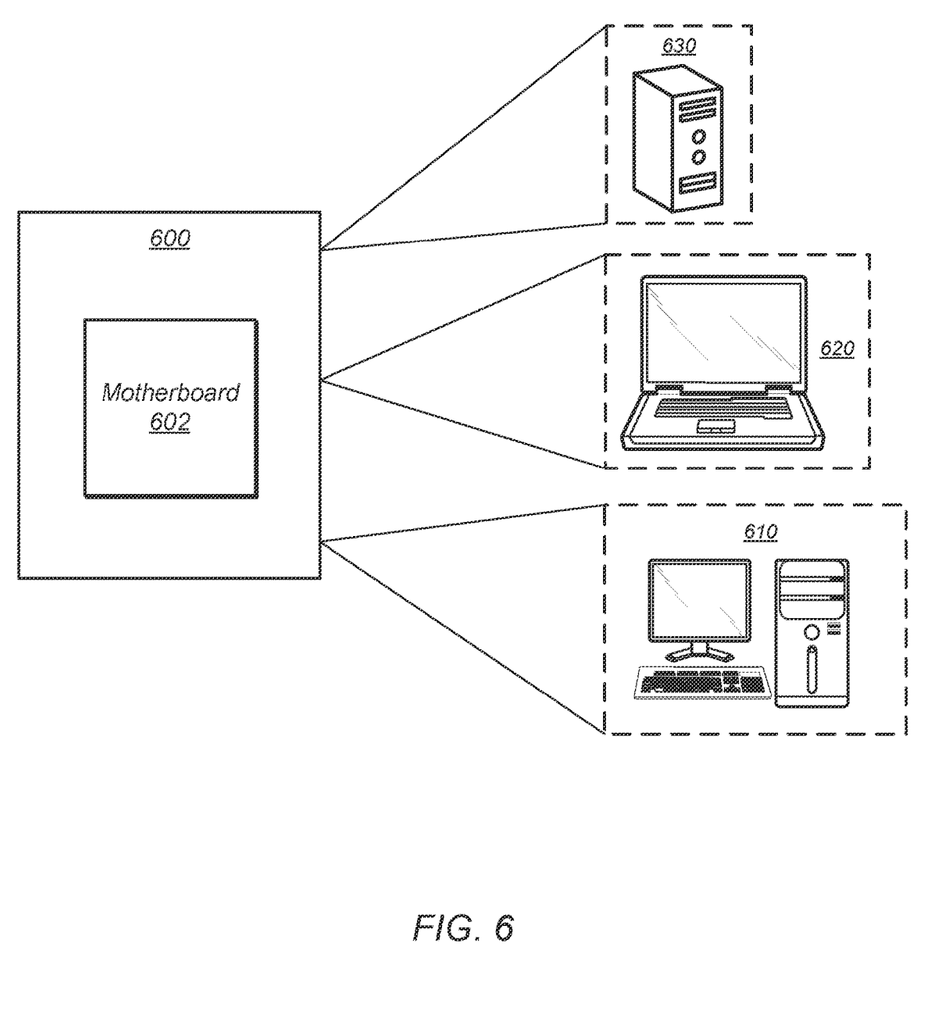
FIG. 6 is a block diagram of one implementation of a computing system.

Turning now to FIG. 6, a block diagram of one implementation of a computing system 600 is shown. As shown, system 600 represents chip, circuitry, components, etc., of a desktop computer 610, laptop computer 620, server 630, or otherwise. Other systems, apparatuses, and devices (e.g., game consoles, mobile devices, smartphones, tablets, wearable devices, Internet of things (IoT) devices) employing motherboard 602 are possible and are contemplated. In the illustrated implementation, the system 600 includes motherboard 602 and any number of other components. It is noted that in other implementations, motherboard 602 may be referred to as "circuit board 602" or "printed circuit board (PCB) 602".

Figure 7:
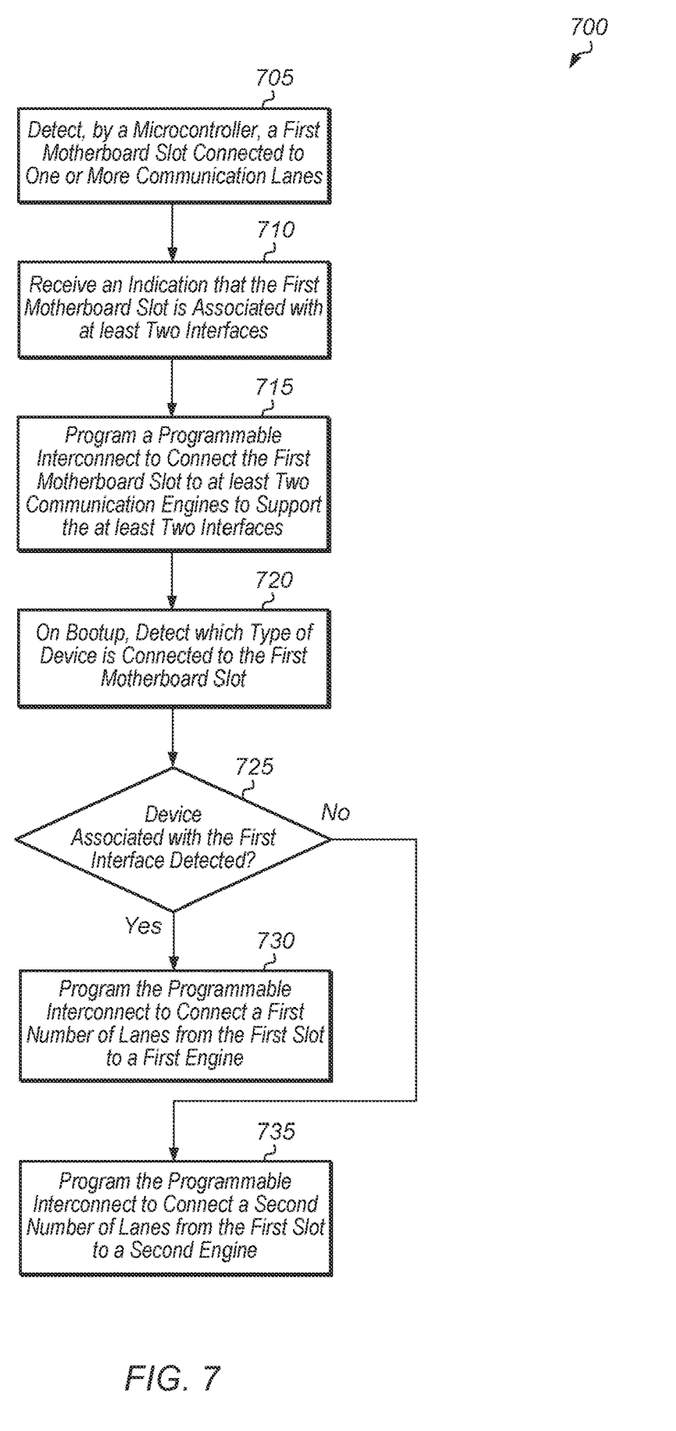
FIG. 7 is a generalized flow diagram illustrating one implementation of a method for enabling a dual-functionality solution for a given motherboard slot.
Figure 8:
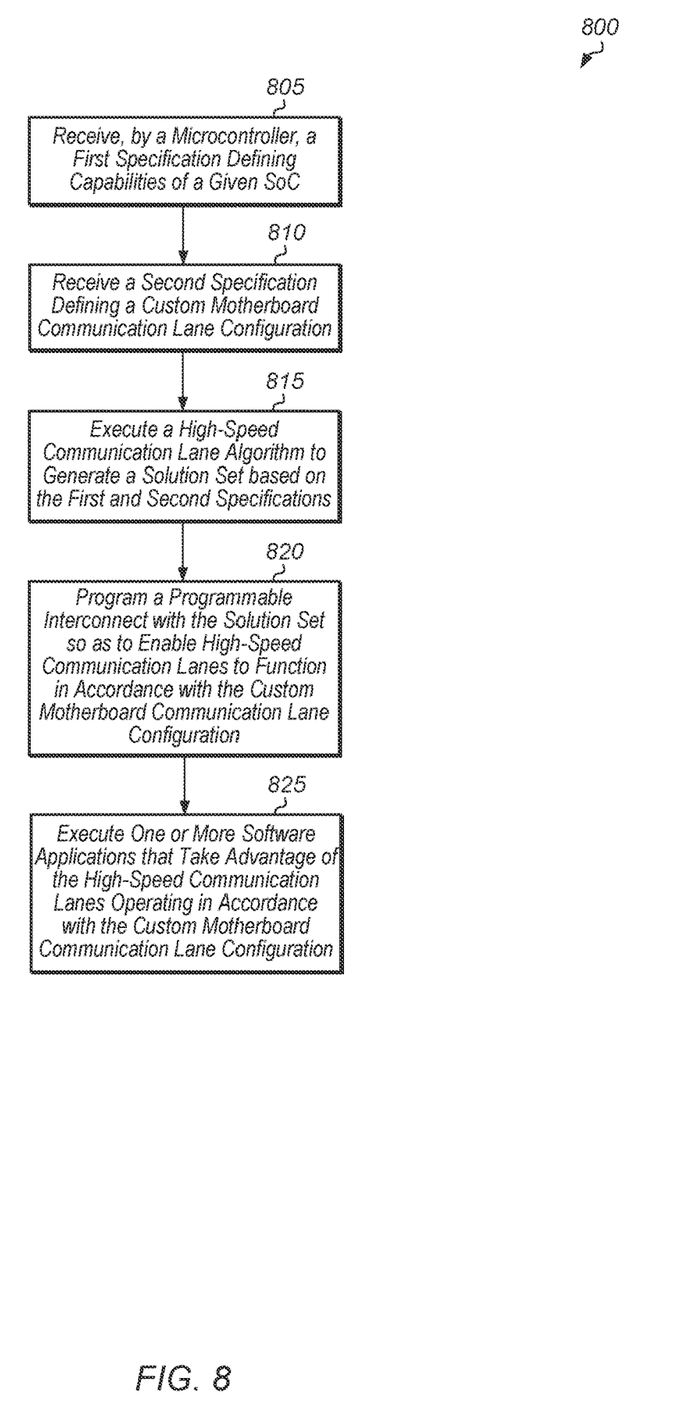
FIG. 8 is a generalized flow diagram illustrating one implementation of a method for generating a custom communication lane solution for a given SoC-motherboard combination.
Figure 9:
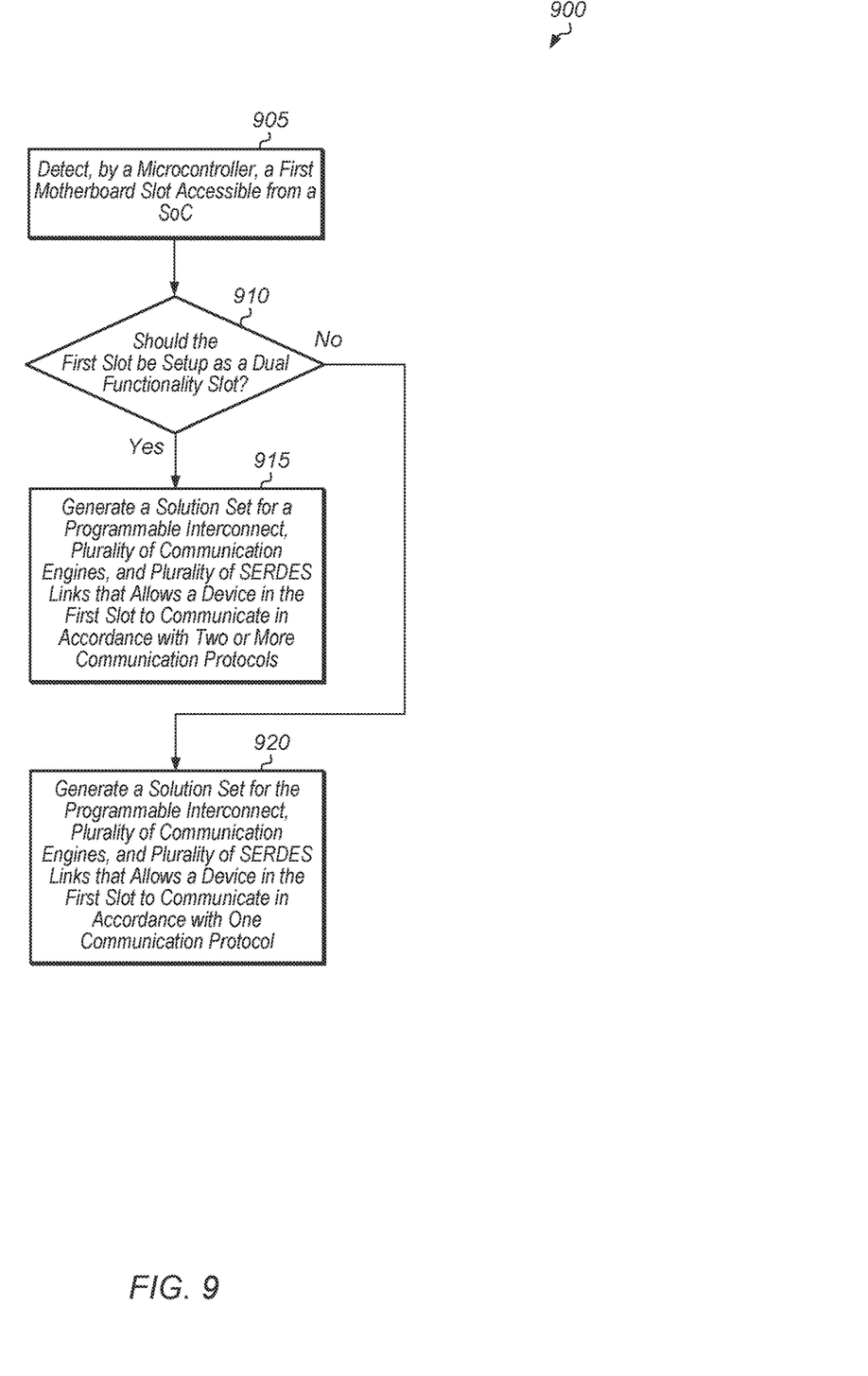
FIG. 9 is a generalized flow diagram illustrating one implementation of a method for managing a dual personality motherboard slot.

Turning now to FIG. 7, one implementation of a method 700 for enabling a dual-functionality solution for a given motherboard slot is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700 (and methods 800-900 of FIG. 8-9).

A microcontroller detects a first motherboard slot connected to one or more communication lanes (block 705). The microcontroller receives an indication that the first motherboard slot is associated with at least two interfaces (e.g., PCIe, SATA) (block 710). In response to receiving the indication, the microcontroller programs a programmable interconnect to connect the first motherboard slot to at least two communication engines to support the at least two interfaces (block 715). It is noted that the communication engines can also be referred to herein as physical layer engines.

On bootup, the microcontroller detects which type of device is connected to the first motherboard slot (block 720). If a device associated with a first interface is detected (conditional block 725, "yes" leg), then the microcontroller programs the programmable interconnect to connect a first number of lanes from the first slot to a first engine (block 730). Otherwise, if a device associated with a second interface is detected (conditional block 725, "no" leg), then the microcontroller programs the programmable interconnect to connect a second number of lanes from the first slot to a second engine (block 735). It is noted that in other implementations, conditional block 725 can have three or more branches for slots that support three or more interfaces. After blocks 730 and 735, method 700 ends.

Turning now to FIG. 8, one implementation of a method 800 for generating a custom communication lane solution for a given SoC-motherboard combination is shown. A microcontroller receives a first specification defining capabilities of a given SoC (block 805). The microcontroller receives a second specification defining a custom motherboard communication lane configuration (block 810). Next, the microcontroller executes a high-speed communication lane algorithm to generate a solution set based on the first and second specifications (block 815). Then, the microcontroller programs a programmable interconnect with the solution set so as to enable high-speed communication lanes to function in accordance with the custom motherboard communication lane configuration (block 820). Next, the given SoC executes one or more software applications that take advantage of the high-speed communication lanes operating in accordance with the custom motherboard communication lane configuration (block 825). After block 825, method 800 ends.

Turning now to FIG. 9, one implementation of a method 900 for managing a dual personality motherboard slot is shown. A microcontroller detects a first motherboard slot accessible from a SoC (block 905). Next, the microcontroller determines if the first motherboard slot should be setup as a dual functionality motherboard slot (conditional block 910). In one implementation, the microcontroller determines if the first motherboard slot should be setup as a dual functionality motherboard slot from a motherboard-vendor-generated (MVG) specification. In other implementations, the microcontroller determines if the first motherboard slot should be setup as a dual functionality motherboard slot based on other factors.

If the microcontroller determines that the first motherboard slot should be setup as a dual functionality motherboard slot (conditional block 910, "yes" leg), the microcontroller generates a solution set for a programmable interconnect, plurality of communication engines, and plurality of SERDES links that allows a device in the first slot to communicate in accordance with two or more communication protocols (block 915). Otherwise, if the microcontroller determines that the first motherboard slot should be setup as a single functionality motherboard slot (conditional block 910, "no" leg), the microcontroller generates a solution set for the programmable interconnect, plurality of communication engines, and plurality of SERDES links that allows a device in the first slot to communicate in accordance with one communication protocol (block 920). After blocks 915 and 920, method 900 ends. In one implementation, method 900 is performed on system boot. It is noted that a separate instance of method 900 can be performed for each different motherboard slot.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a programmable interconnect configured to connect a plurality of physical layer circuits supporting a plurality of different communication protocols to a plurality of communication lanes; and
a microcontroller comprising circuitry configured to program the programmable interconnect to connect a first motherboard slot to at least two physical layer circuits to support at least two interfaces, each corresponding to a different one of the plurality of different communication protocols, responsive to the first motherboard slot supporting the at least two interfaces.

2. The apparatus as recited in claim 1, wherein the microcontroller is further configured to:
detect a given device connected to the first motherboard slot on bootup; and
generate one or more control signals to cause signals from the first motherboard slot to be routed to a first physical layer circuit responsive to the given device being associated with a first interface.

3. The apparatus as recited in claim 1, wherein the programmable interconnect enables the plurality of communication lanes to be shared by the at least two physical layer circuits.

4. The apparatus as recited in claim 1, wherein the microcontroller is further configured to:
receive a first specification defining capabilities of a given system on chip (SoC);
receive a second specification defining a custom motherboard communication lane configuration; and
generate a solution set based on the first specification and the second specification.

5. The apparatus as recited in claim 2, wherein the microcontroller is further configured to generate one or more control signals to cause signals from the first motherboard slot to be routed to a second physical layer circuit responsive to the given device being associated with a second interface.

6. The apparatus as recited in claim 5, wherein:
the first interface is a peripheral component interconnect express (PCIe) interface; and
the second interface is a serial advanced technology attachment (SATA) interface.

7. The apparatus as recited in claim 4, wherein the microcontroller is further configured to program the programmable interconnect with the solution set so as to enable the plurality of communication lanes to function in accordance with the custom motherboard communication lane configuration.

8. A method comprising:
programming, by a microcontroller, a programmable interconnect to connect a first motherboard slot to at least two physical layer circuits supporting a plurality of different communication protocols to support at least two interfaces, responsive to the first motherboard slot supporting the at least two interfaces, each corresponding to a different one of the plurality of different communication protocols.

9. The method as recited in claim 8, further comprising:
detecting a given device connected to the first motherboard slot on bootup; and
generating one or more control signals to cause signals from the first motherboard slot to be routed to a first physical layer circuit responsive to the given device being associated with a first interface.

10. The method as recited in claim 8, further comprising enabling, by the programmable interconnect, a plurality of communication lanes to be shared by the at least two interfaces.

11. The method as recited in claim 8, further comprising:
receiving a first specification defining capabilities of a given system on chip (SoC);
receiving a second specification defining a custom motherboard communication lane configuration; and
generating a solution set based on the first and second specifications.

12. The method as recited in claim 9, further comprising generating one or more control signals to cause signals from the first motherboard slot to be routed to a second physical layer circuit responsive to the given device being associated with a second interface.

13. The method as recited in claim 12, wherein:
the first interface is a peripheral component interconnect express (PCIe) interface; and
the second interface is a serial advanced technology attachment (SATA) interface.

14. The method as recited in claim 11, further comprising programming the programmable interconnect with the solution set so as to enable high-speed communication lanes to interface in accordance with the custom motherboard communication lane configuration.

15. A system comprising:
a plurality of physical layer circuits configured to support a plurality of different communication protocols;
a plurality of communication lanes;
a programmable interconnect configured to connect the plurality of physical layer circuits to the plurality of communication lanes; and
a microcontroller configured to:
responsive to a first slot supporting at least two interfaces, each corresponding to a different one of the plurality of different communication protocols:
program the programmable interconnect to connect the first slot to at least two physical layer circuits to support the at least two interfaces.

16. The system as recited in claim 15, wherein the programmable interconnect enables the plurality of communication lanes to be shared by the at least two physical layer circuits.

17. The system as recited in claim 15, wherein the microcontroller is further configured to:
receive a first specification defining capabilities of a given system on chip (SoC);
receive a second specification defining a custom motherboard communication lane configuration; and
generate a solution set based on the first specification and the second specification.

18. The system as recited in claim 15, wherein the microcontroller is further configured to:
detect a given device connected to the first slot on bootup; and
generate one or more control signals to cause signals from the first slot to be routed to a first physical layer circuit responsive to the given device being associated with a first interface.

19. The system as recited in claim 18, wherein the microcontroller is further configured to generate one or more control signals to cause signals from the first slot to be routed to a second physical layer circuit responsive to the given device being associated with a second interface.

20. The system as recited in claim 17, wherein the microcontroller is further configured to program the programmable interconnect with the solution set so as to enable the plurality of communication lanes to function in accordance with the custom motherboard communication lane configuration.

* * * * *